United States Patent [19]

Robertson et al.

[11] Patent Number: 5,561,269
[45] Date of Patent: *Oct. 1, 1996

[54] ENCLOSURE FOR SPLICED COAXIAL CABLES

[75] Inventors: James W. Robertson, Oberlin; David R. Radliff, Harrisburg, both of Pa.

[73] Assignee: The Whitaker Corporation, Wilmington, Del.

[*] Notice: The term of this patent shall not extend beyond the expiration date of Pat. No. 5,397,859.

[21] Appl. No.: 263,899

[22] Filed: Jun. 21, 1994

Related U.S. Application Data

[63] Continuation-in-part of Ser. No. 166,180, Dec. 10, 1993, Pat. No. 5,397,859.

[51] Int. Cl.⁶ ............................................. H01R 4/22
[52] U.S. Cl. .................................... 174/92; 174/93
[58] Field of Search .................... 174/92, 93, 84 R, 174/88 R, 41

[56] References Cited

U.S. PATENT DOCUMENTS

| | | | |
|---|---|---|---|
| Re. 26,994 | 12/1970 | Fuller et al. | 174/84 R |
| 3,147,338 | 9/1964 | Ekvall et al. | 174/138 |
| 3,183,302 | 5/1965 | Wochner et al. | 174/138 |
| 3,325,591 | 6/1967 | Wahl | 174/138 |
| 3,383,642 | 5/1968 | Nava et al. | 174/84 R |
| 3,525,799 | 8/1970 | Ellis | 174/84 R |
| 3,757,031 | 9/1973 | Izraeli | 174/138 F |
| 3,879,575 | 4/1975 | Dobbin et al. | 174/92 |
| 4,219,693 | 8/1980 | French | 174/135 |
| 4,435,612 | 3/1984 | Smith | 174/92 |
| 4,451,696 | 5/1984 | Beinhaur | 174/92 |
| 4,550,220 | 10/1985 | Kitchens | 174/138 F |
| 4,610,738 | 9/1986 | Jervis | 156/49 |
| 4,643,505 | 2/1987 | House et al. | 339/75 P |
| 4,701,574 | 10/1987 | Shimirak et al. | 174/93 |
| 4,718,678 | 1/1988 | Vansant | 174/77 R |
| 4,744,629 | 5/1988 | Bertoglio et al. | 174/92 |
| 4,795,857 | 1/1989 | McInnis | 174/138 F |
| 4,849,580 | 7/1989 | Reuter | 174/92 |
| 4,859,809 | 8/1989 | Jervis | 174/92 |
| 4,879,436 | 11/1989 | Braham | 174/92 |
| 4,909,756 | 3/1990 | Jervis | 439/521 |
| 4,935,582 | 6/1990 | Calligaris | 174/92 |
| 4,963,700 | 10/1990 | Olsen et al. | 174/138 |
| 4,998,894 | 3/1991 | Gronvall | 439/521 |
| 5,046,766 | 9/1991 | Lomberty et al. | 174/92 |
| 5,099,088 | 3/1992 | Usami et al. | 174/76 |
| 5,146,650 | 9/1992 | Robertson | 16/259 |
| 5,173,573 | 12/1992 | Jervis | 174/138 F |
| 5,322,973 | 6/1994 | Dagan | 174/92 |
| 5,347,084 | 9/1994 | Roney et al. | 174/92 |
| 5,397,859 | 3/1995 | Robertson et al. | 174/92 |

FOREIGN PATENT DOCUMENTS

| | | |
|---|---|---|
| 0529957 | 8/1992 | European Pat. Off. . |
| 2358031 | 3/1978 | France ................. 174/92 |
| 2261775A | 5/1993 | United Kingdom . |
| WO92/22116 | 12/1992 | WIPO . |

OTHER PUBLICATIONS

Electrical World, vol. 156 No. 22; Nov. 27, 1961; p. 60; Jasper Blackburn Corp., St. Louis, MO.

Primary Examiner—Kristine L. Kincaid
Assistant Examiner—Marc D. Machtinger
Attorney, Agent, or Firm—Anton P. Ness

[57] ABSTRACT

A cable splice enclosure (10) including a pair of cover members (12,14) joined along a flexible hinge (62,64) and rotatable together about the hinge to enclose a cable splice (150) and secure to each other with latches along both side edges (16,18;92,94). Sealant material (120) disposed within central regions (32,34) of both covers environmentally seals the surfaces of the splice connection (154,158,160) upon full closure. Embossments (44,46) on both sides of the cable-receiving channels (20,22) in associated pairs (40,42,48) proximate the cable exits include resilient flange portions (52,54) cooperate to press into the cable insulation upon full closure to define a strain relief. The enclosure (200) may be used to splice aerially suspended cable (202) by grooves (208) between the hinge (216) and the latches (218) proximate the hinge (216), receiving thereinto a length of suspension wire (206) spliced to suspension wire (204) thus securing enclosure (200) to cable (202).

4 Claims, 7 Drawing Sheets

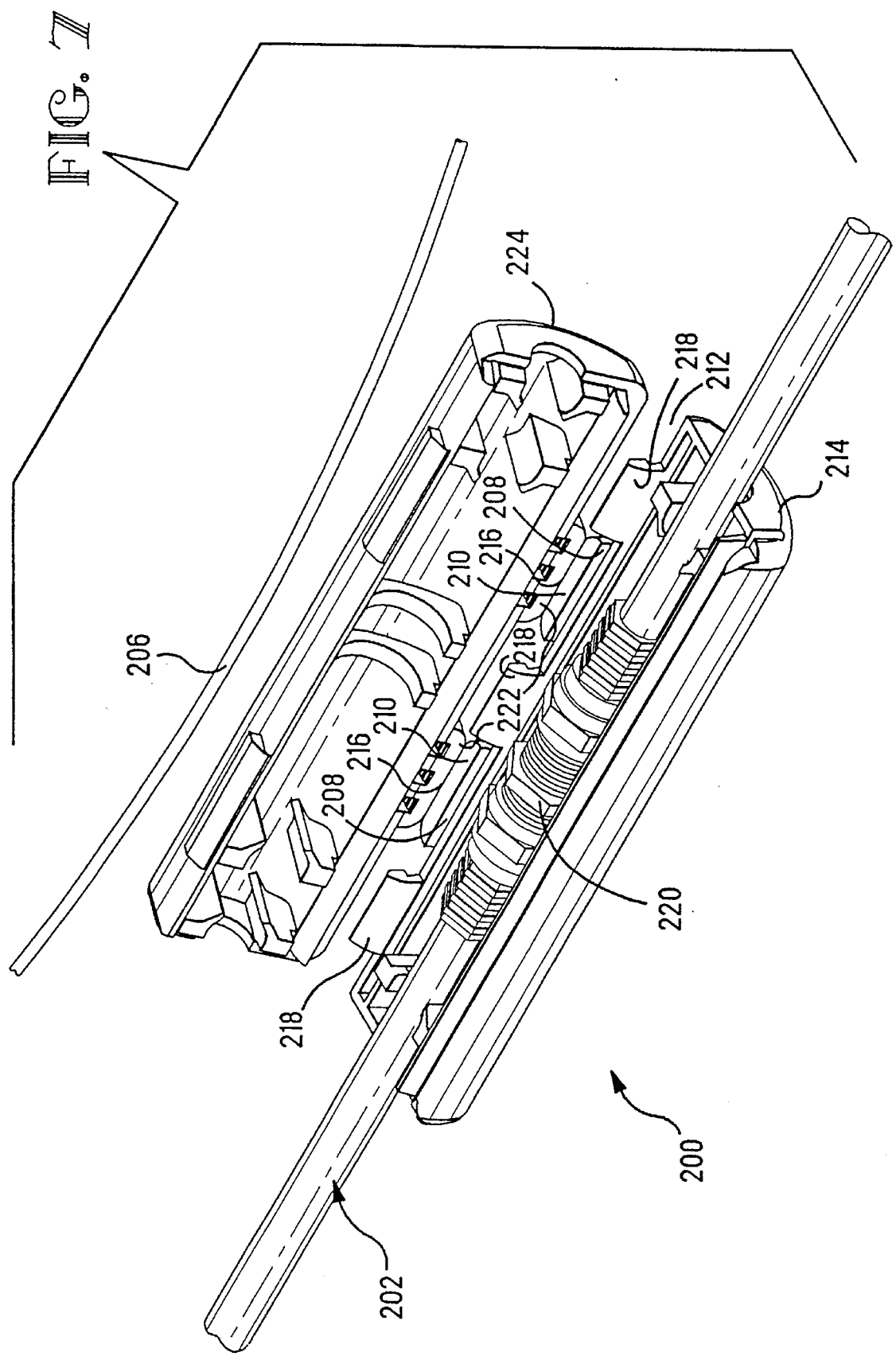

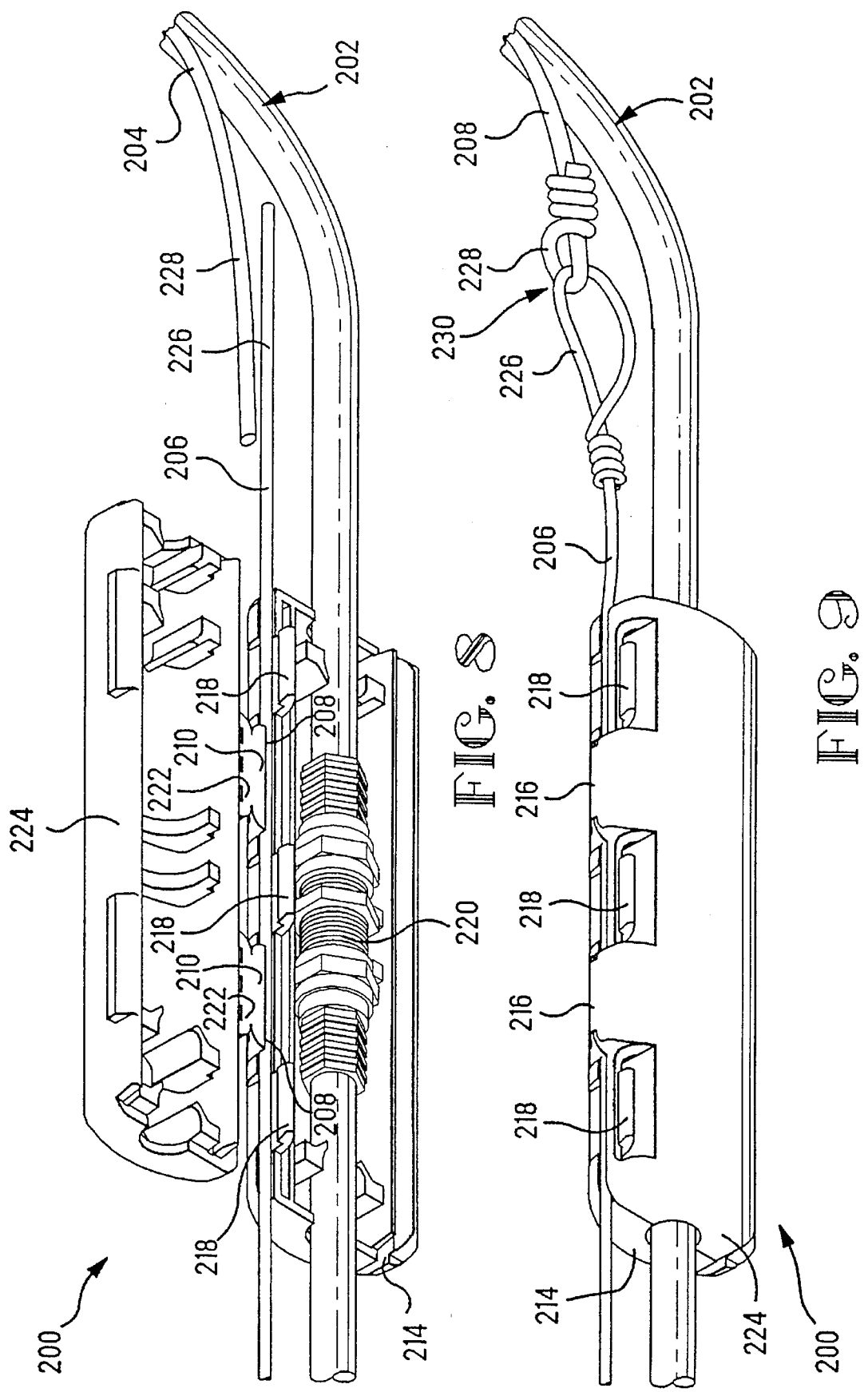

ENCLOSURE FOR SPLICED COAXIAL CABLES

RELATED APPLICATION INFORMATION

This is a Continuation-in-Part of U.S. patent application Ser. No. 08/166,180 filed Dec. 10, 1993 now U.S. Pat. No. 5,397.859.

FIELD OF THE INVENTION

This relates to the field of enclosures for electrical cable splices, and more particularly to sealant-filled enclosures for coaxial cable splices.

BACKGROUND OF THE INVENTION

Splices of electrical conductors generally must be insulated and sealed for environmental protection of the connection. A variety of enclosures have been devised into which the spliced conductors are disposed after the connection has been completed. An example of such an enclosure is disclosed in U.S. Pat. No. 3,183,302 in which an elongate casing comprises a pair of semicylindrical clamshell members joined axially along an integral hinge and together define a cavity into and along which the in-line spliced connection of two wires is disposed. The clamshells are rotated together about the connection and latched together, with the wires extending outwardly of wire exits at each end at which an array of resilient strips engages the insulation of the respective wires. Pairs of resilient internal tabs are said to preclude any substantial longitudinal movement of the splice connection within the casing, by abutting the ends of the connector in which the ends of the conductors are spliced by crimping. The casing may include a sealant material therewithin for sealing the exposed conductors of the wires from the environment.

Other splice enclosures are disclosed for use with in-line splices such as: U.S. Pat. No. 3,879,575 containing gel and secured together with clips about the periphery; U.S. Pat. No. 4,935,582 containing a layer of mastic sealer lining the in-line groove and latched-together cover halves; and U.S. Pat. No. 5,099,088 comprising a transparent vacuum molded plastic sheet bendable about an axial hinge and containing opposed reservoirs of gelled photocurable sealant, and including bendable wire-engaging portions at the wire exits.

Still others are disclosed for use with in-line splices and including various mechanisms for generating biasing force of the sealant material against the sealed conductive surfaces of the splice connection, and various mechanisms for securing the enclosure covers together, as in U.S. Pat. No. 4,550,220 having a flexed plastic cover containing a foam sealant core and latched by interlocking edges; U.S. Pat. No. 4,610,738 including a bolt and nut arrangement for securing the splice in position, an organizer for use with multiple spliced connections, and external spring clip fasteners; U.S. Pat. No. 4,849,580 having an internal convex spring plate; U.S. Pat. No. 4,859,809 having an external spring surrounding deformable cover halves; U.S. Pat. No. 4,963,700 with a pair of nestable convex cover halves clamped together by cooperable ratcheted surfaces; and U.S. Pat. No. 5,173,573 having an external captive spring about the cover halves and disclosed to be especially useful for coaxial cable splices to be buried.

In U.S. Pat. No. 4,451,696 a sealant device is taught to include one or more compression buttons which when compressed after application about a cable splice, causes the sealant through hydraulic pressure to completely fill all voids which may exist within the enclosure, forcing the sealant around and along the splice connector bolt and the wires. In U.S. Pat. No. 4,795,857 is disclosed a housing having wire exits at a common end, and including frangible dams at the wire exits to maintain the gel sealant within the housing half-sections during filling, and which are crushed by the cables when the two half-sections are pressed together about the spliced wire pair; aforementioned U.S. Pat. No. 5,173,573 also discloses a thin breakout portion or array of resilient gripping fingers at a wire exit serving to maintain the gel sealant within the half-sections and engage and be deflected by the cables upon application about the splice.

SUMMARY OF THE INVENTION

The splice enclosure of the present invention includes a pair of generally semicylindrical cover members joined at an integral axial hinge along near side edges, with cooperable latch arms or projections and latch-engaging surfaces along respective near and far side edges, all molded from thermoplastic resin as a single piece. At both ends of the cover members are semicylindrical recesses together defining cable exits at each end upon cover closure. Sealant material is disposed within each of the cover members and may be a gel material such as is disclosed for example in European Patent Publication 0 529 957 A1. Upon the spliced connection between a pair of cables being disposed along one of the cover members and closure of the cover members, the spliced connection and a length of each cable to either side is enclosed within the enclosure, and the spliced connection is embedded in gel sealant material thus protecting the connection from the environment.

In one aspect of the invention, each cover member near each end or cable exit includes at least one pair of embossments coextending from the inner surface spaced apart sufficiently to permit the cable to be disposed therebetween. The pairs of embossments at each end of each cover member are staggered axially with respect to the pairs of the other cover member, permitting the cover members to be rotated together without the embossments abutting or interferingly engaging to prevent or resist cover closing. One of the cover members may have two pairs of embossments at each end, receiving the pair of embossments of the other cover member therebetween upon cover closing. Each pair of embossments, or the innermost of two pairs of embossments at one end of a cover member, may if desired initially include a frangible dam for confining the sealant in the center region of each cover member and thus defining a sealant-free void adjacent each cable exit. Upon placement of the spliced cable assembly into one cover member and closure of the other cover member therewith, the frangible dams would be deflected or crushed permitting the sealant in the center region to be extruded into the sealant-free voids after fully embedding the splice connector joining the cables in the center region.

In this aspect of the present invention, each embossment of each pair of embossments includes a flange portion extending at an angle both toward each other and toward the axial center of the enclosure, such that the flange portions are engaged and deflected outwardly by the opposing sides of the insulative jacket of the cable pressed between the embossments. The angled flange portions tend to dig or bite into the cable insulation especially in the event that the cable is strained or pulled toward the cable exit, since the deflected flange portions are also being pulled toward the cable exit tending to rotate them toward each other and therefore more tightly against the cable insulation. The present invention thus defines an integral cable strain relief cooperable with the coaxial cables without deforming the cables sufficiently to adversely affect the signals transmitted therealong. The flange portions are sufficiently resilient to permit use of the enclosure with several diameters of coaxial cable within a limited range thereof, or with a splice connection between cables of two different diameters.

In another aspect of the invention, integral latching systems are provided along both side edges of the pair of cover members, even along the side edge containing the living hinge, thus providing assured fastening of the cover members upon full closure irrespective of the integrity of the hinge after closure. Further, cooperable inner wall portions and grooves along each side edge interiorly of the latching systems assure retention of the sealant material within the cover members both during final stages of closure about the cable splice, and thereafter, assuring full embedment and sealing of the splice connection.

In another embodiment of the invention, the splice enclosure is adapted to be utilized with cable that extends aerially and includes a strength wire therealong permitting physical attachment of the cable to support such as poles and buildings without stressing the conductors of the cable. The enclosure includes structure for being secured around a length of strength wire of the cable, such as a separate length spliced to ends of the strength wire of the original cable at the splice location. Wire-receiving grooves are defined into axially extending flange portions along the hinged side of one cover member of the enclosure inwardly of the hinge portions but outwardly of the latch members along the hinged side; the enclosure in its open position is placed about the strength wire with the spliced strength wire length extending along the grooves; and upon closure about the cable splice connection the spliced strength wire length is trapped in the grooves by complementary flange portions of the opposite cover member of the enclosure with the hinge outwardly thereof and the latches inwardly thereof.

The present invention is especially useful with splices of coaxial telecommunication or CATV cable wherein a splice connection is defined by threaded engagement between an adapter and complementary connectors affixed to ends of the respective coaxial cables. Preferably each cover member includes a pair of semicylindrical collars spaced apart at the axial center, shaped and dimensioned to cooperate upon cover closure to closely surround the splice connection inwardly of commonly hexagonal rotatable nuts of the connectors utilized during affixing each connector to the splice adapter, and outwardly of the tool-engageable flange of the splice adapter utilized to couple and uncouple the connectors and the adapter. The collars secure the splice connection centrally within the enclosure both radially and axially.

It is an objective of the present invention to provide a one-piece splice enclosure self-lockable about the splice connection upon closure therearound.

It is another objective to provide such a splice enclosure with integral cable strain relief, especially one suitable for use with coaxial cable.

It is also an objective to provide such a splice enclosure for use with cable of at least two differing diameters.

It is further an objective to provide such a splice enclosure with sealant material disposed therewithin adapted to embed and seal the exposed metal portions of the splice connection upon closure therearound.

It is an additional objective to provide such a splice enclosure with upstanding wall portions inwardly of the latching arrangements along each side for retention of sealant material within the enclosure upon cover closure about and sealant embedment of the splice connection.

It is yet another objective to provide a one-piece enclosure of resilient material which comprises a pair of complementary cover members initially joined to each other along a common edge by an integral hinge, with a latching arrangement including complementary latching members both along the hinge-remote edge and along the hinge-proximate edge, assuring latching along both edges upon closure irrespective of the integrity of the hinge joint after flexure.

It is an additional objective to provide such a one-piece enclosure that self-retains onto an aerially suspended cable at a splice thereof.

An embodiment of the present invention will now be described by way of example with reference to the accompanying drawings.

BRIEF DESCRIPTION OF THE DRAWINGS

FIGS. 7 to 9 are isometric views of another embodiment of the enclosure illustrating attachment of the enclosure to a suspension wire of an aerial coaxial cable.

DETAILED DESCRIPTION OF THE PREFERRED EMBODIMENT

Splice enclosure 10 of the present invention is moldable in a single piece of thermoplastic resin to define two similar generally semicylindrical cover members 12,14. Cover members 12,14 are joined along near edges 16,18 by an integral hinge which permits the cover members to be rotated together for closure about an in-line splice connection between a pair of cables.

Figure 1:
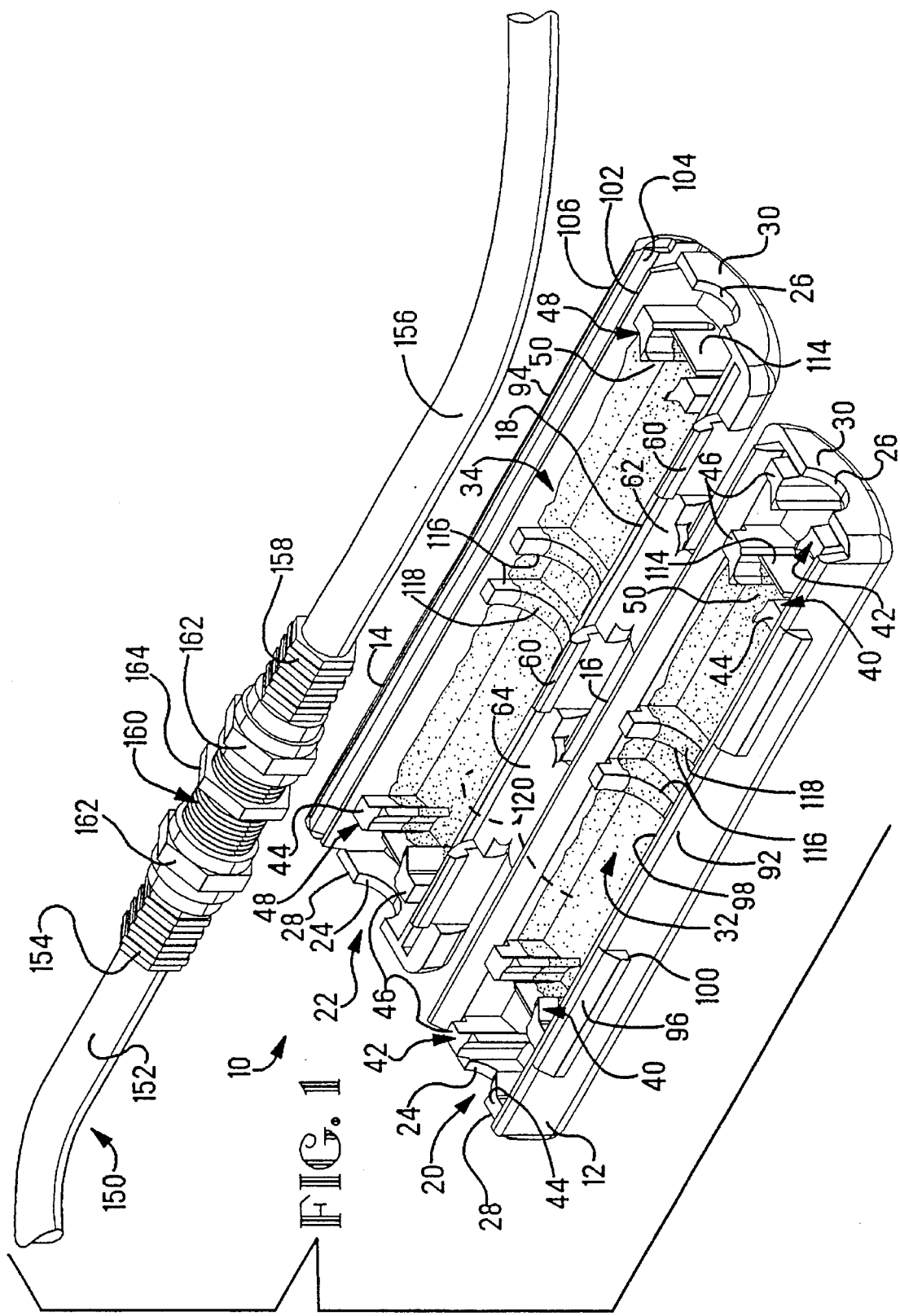
FIGS. 1 and 2 are isometric views of the enclosure of the present invention having sealant material disposed within the cover members, with a splice connection exploded from and inserted within the enclosure, respectively.
Figure 2:
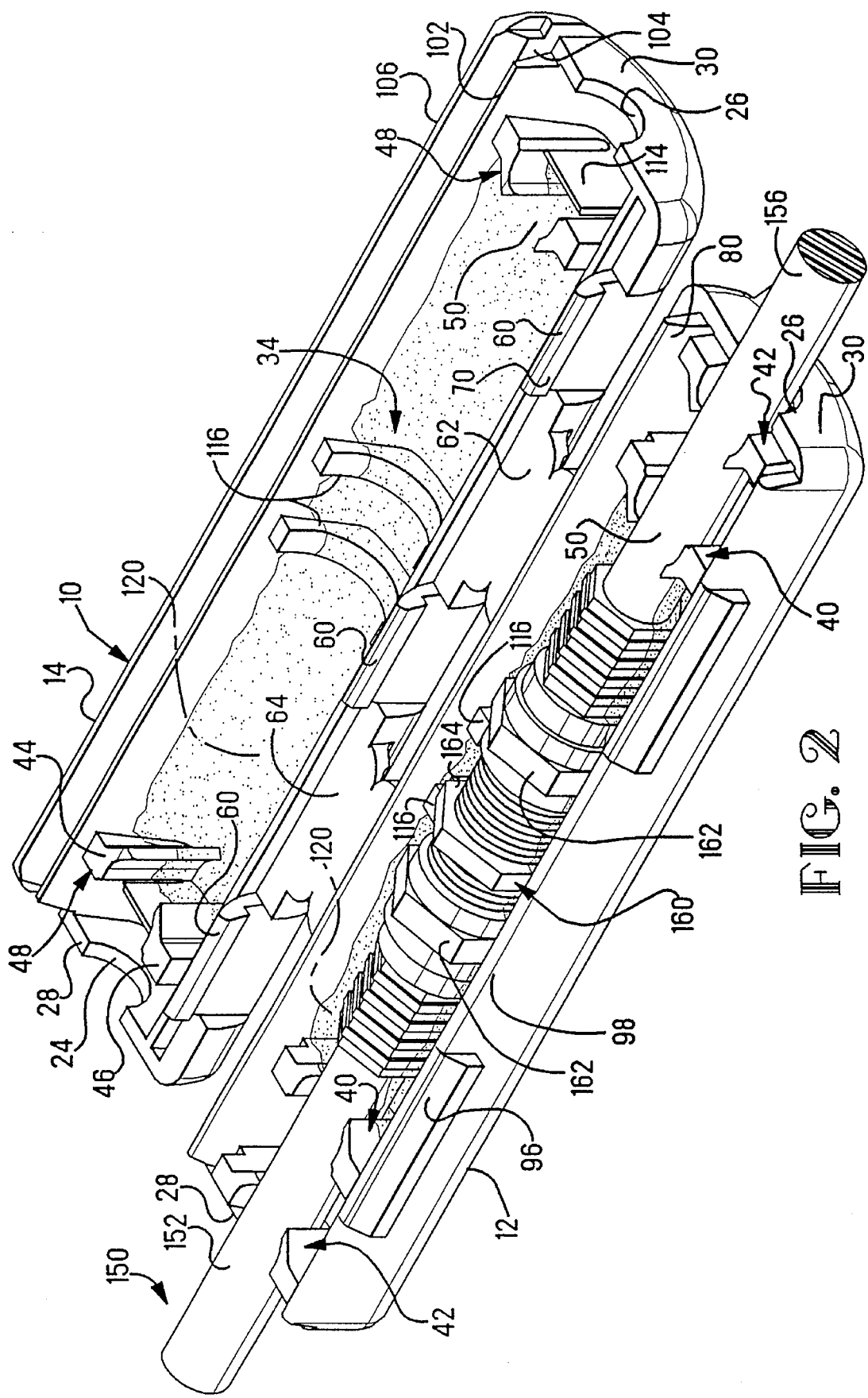

A representative cable splice 150 such as for CATV cable is shown in FIGS. 1 and 2 wherein cable 152 includes a connector 154 affixed thereto, and cable 156 includes a connector 158 affixed thereto, with connectors 154,158 mated with a splice adapter 160 to define a cable splice 150. Each connector conventionally includes a rotatable nut 162, and splice adapter 160 includes a tool-engageable flange 164 utilized to grip the splice adapter when threading thereto the connectors axially into a fully mated condition therewith.

Each cover member 12,14 defines a semicylindrical cable-receiving channel 20,22 axially therealong extending between semicylindrical recesses 24,26 at end walls 28,30 that define cable exits. A central region 32,34 is adapted to receive the splice connection thereinto. Axially outwardly therefrom, cover member 12 includes first and second pairs 40,42 of embossments 44,46 spaced apart at each end, while cover member 14 includes a pair 48 of embossments 44,46 opposed from and centered with respect to first and second embossment pairs 40,42 of cover member 12. Embossments 44,46 coextend from the inner surface of the cover members spaced apart a distance larger than the diameter of the largest-diameter cable with respect to which the enclosure is to be used, defining a gap 50 through which a cable 152,156 will extend.

Figure 3:
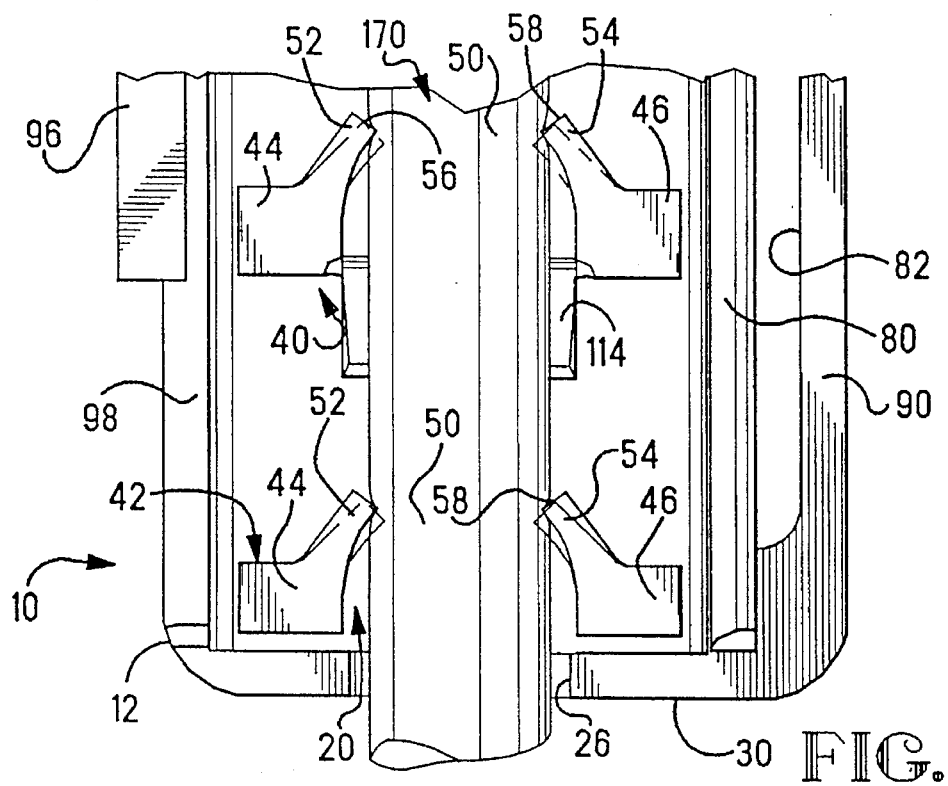
FIGS. 3 and 4 are enlarged plan views of one end of a cover member illustrating the use of the enclosure with cables of different diameters, with flange portions of embossments gripping the cable insulation.
Figure 4:
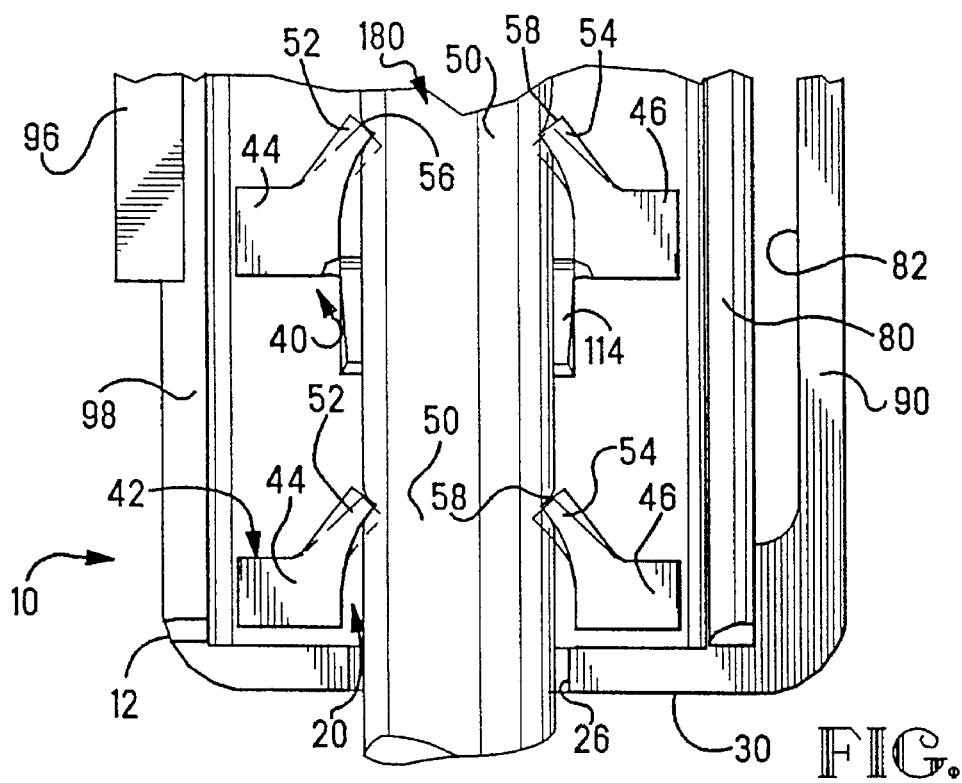

Each embossment 44,46 includes a flange portion 52,54 extending therefrom at an angle toward the other embossment and also toward central region 32,34 to a free end 56,58. Each of the pairs of flange portions 52,54 are spaced apart a distance less than the diameter of the smallest-diameter cable with respect to which the enclosure is to be used, and are deflectable radially outwardly by the insulative cable jacket upon insertion of the cable splice 150 within cover member 12, and upon subsequent closure of cover member 14 around the cable splice 150. FIG. 3 illustrates deflection of the flange portions by a smaller diameter cable 170, such as 0.242 inches, while FIG. 4 illustrates deflection by a larger diameter cable 180, such as 0.295 inches. In either case, leading ends 56,58 of flange portions 52,54 partially bite into the insulative cable jacket 166 and it can be seen that movement of the cable toward the respective cable exit would tend to rotate the flange portions together toward each other and more into the cable jacket thus resisting any movement of the cable relatively toward its corresponding cable exit, and defining a cable strain relief.

Figure 5:
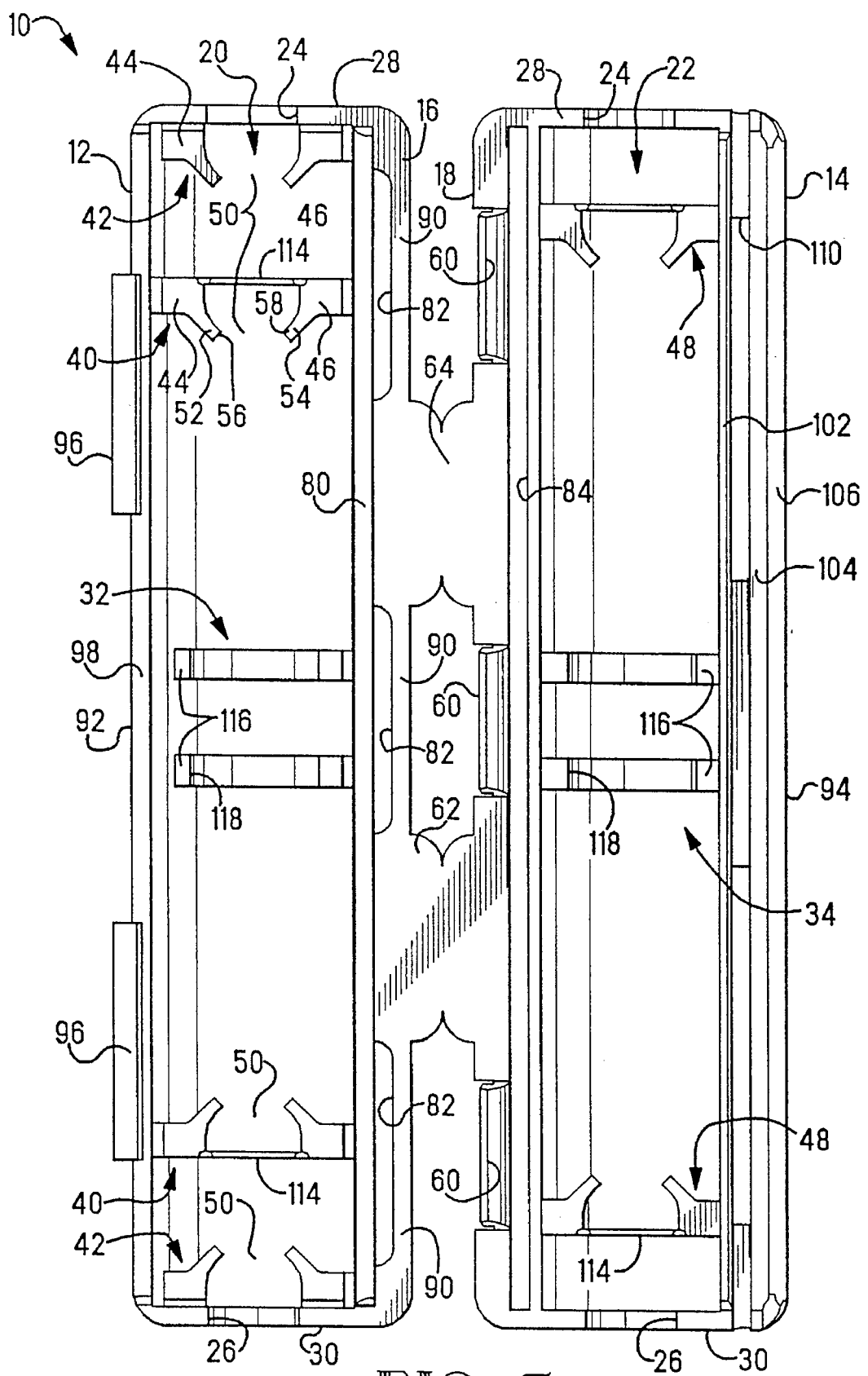
FIG. 5 is a plan view of the enclosure of FIGS. 1 and 2 illustrating the enclosure interior.
Figure 6:
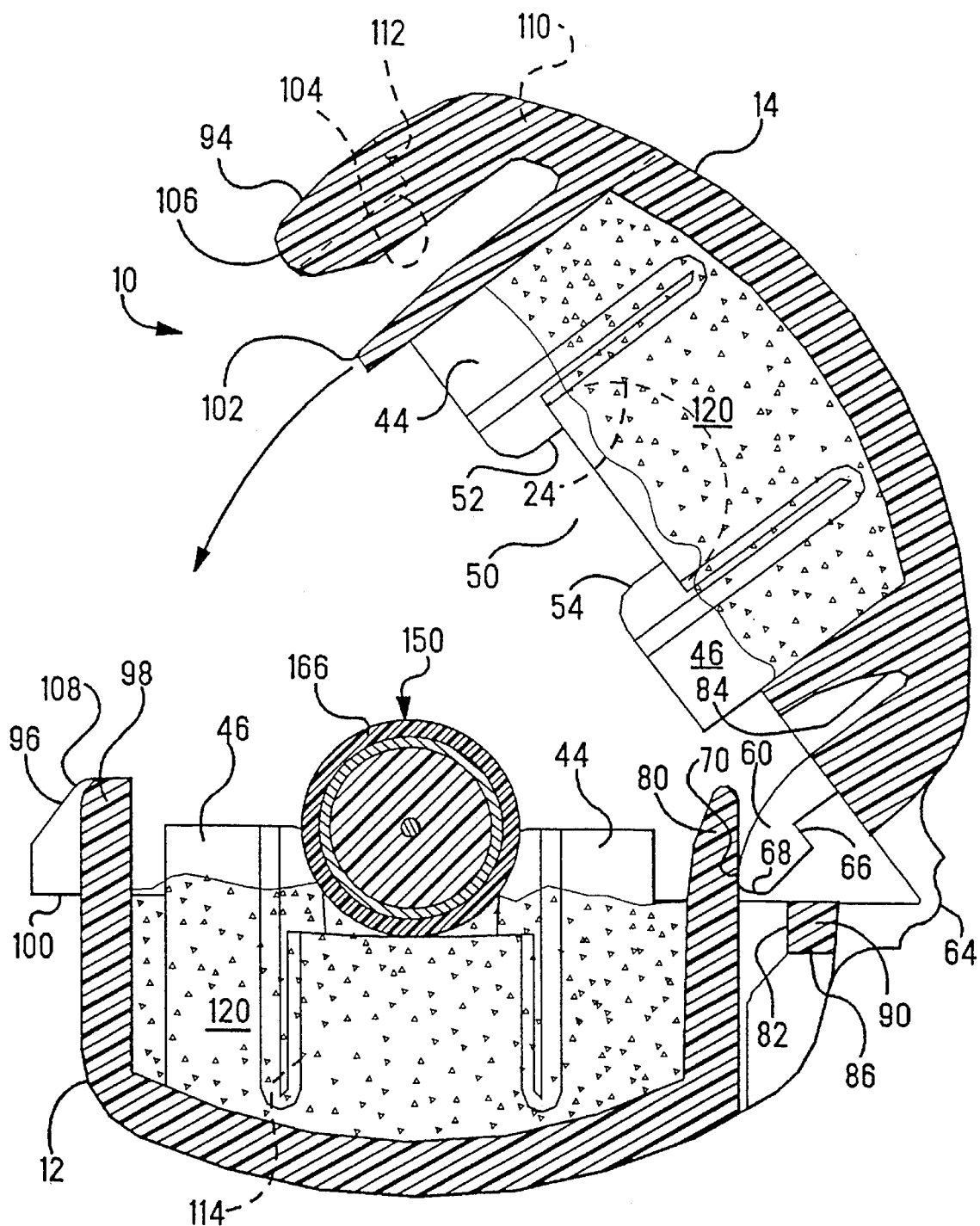
FIG. 6 is a cross-section of the enclosure partially closed about a cable splice.

Referring now to FIGS. 2, 5 and 6, an array of three latch arms 60 is shown formed along near edge 18 of cover member 14, with the integral hinge comprising two hinge portions 62,64 disposed on either side of the central one of latch arms 60, allowing molding of latch surfaces 66 on latch arms 60. Leading ends 68 of latch arms 60 include an arcuate bearing surface 70 facilitating initial bearing engagement with a leading end of upstanding wall section 80 of cover member 12 during closure, as latch arms 60 enter corresponding slots 82 outwardly of wall section 80. Upon full closure, upstanding wall section 80 is received into groove 84 inwardly of latch arms 60, and latching surfaces 66 of latch arms 60 will latch behind corresponding latching surfaces 86 defined by bridge sections 90 formed along the outer surface of cover member 12 proximate near edge 16. This latching arrangement along near edges 16,18 provides an assured joint between cover members 12,14 along edges 16,18 after closure, eliminating reliance on the integral hinge which may become weakened or even broken upon cover closure.

Along far edges 92,94 of cover members 12,14 is defined another latching system. A pair of latch projections 96 are defined along the outer surface of cover member 12 on an upstanding wall section 98 at far edge 92, defining latching surfaces 100 facing away from the opposed cover member 14 during closure. The latching members of both cover members 12,14 are designed to be molded in a simple two-draw molding process utilizing only core pins aligned with the direction of opening and closing of the mold halves. Such molding advantages are disclosed in U.S. Pat. No. 5,146,650 wherein a hinged fastening system is fabricated with respect to an enclosure and a lid pivotable with respect thereto by molding the necessary features integrally with the enclosure and lid members.

Cover member 14 includes an inner upstanding wall section 102 which will be received by cover member 12 inwardly of wall section 98 containing latch projections 96, as wall section 98 is received into corresponding groove 104 defined between inner upstanding wall section 102 and outer wall section 106. The leading end of latch projection 96 is provided with a rounded and angled outwardly facing surface 108 which facilitates initial engagement with and bearing against the inner surface of outer upstanding wall section 106. Latch-receiving slots 110 are formed into the side of outer wall section 106 proximate the bottom of groove 104 for receipt of latch projections 96 outwardly thereinto, with latching surfaces 100 latchable against corresponding latching surfaces 112 (see FIG. 6) upon full cover closure.

Together, upstanding wall sections 80,102 extend along opposed sides of central regions 32,34 and serve to retain sealant material of the central regions within the enclosure during final stages of closure about a cable splice. Leading edges of wall sections 80,102 are rounded or angled to facilitate initial engagement without stubbing with surfaces of the complementary wall-receiving regions of the opposed cover member, such as wall section 80 with the inner wall of groove 84 and wall section 102 with the inner surface of wall section 98. The leading edges are also shaped and dimensioned to bear against the engaged surfaces under slight compression throughout the final stages of cover closure, serving to bound the central regions of the cover members along the side edges and to seal off openings thereat through which the sealant material might otherwise be extruded.

As seen in FIGS. 1 and 6, upstanding frangible dams 114 are provided between projections 44,46 of pairs 40 and 48, extending into cable-receiving channels 20,22 adjacent central regions 32,34. Dams 114 are optional, useful with sealant material which may not be particularly thixotropic or gel-like, to enable retention of sealant material 120 within central regions 32,34 during and after filling and prior to placement of cable splice 150 into the enclosure. During placement of cable splice 150 into cover 12 and closing of cover 14, dams 114 are crushed or deflected permitting sealant 120 to be extruded into the sealant-free voids adjacent the cable exits. Also, it may be desired to provide sealant in all areas of the cover members resulting in a sufficient quantity of material to extrude outwardly of the cable exits upon full closure of the enclosure about the cable splice, thus defining a visible indication of full embedment of the splice connection.

The sealant material may be for example a gel material such as is disclosed in European Patent Publication 0 529 957 A1, and may be a mixture of an elastomeric thermoplastic polymer such as a composite of diblock and triblock copolymers, and an extender such as a mixture of mineral oil and polyisobutene, and also may include silica and another polymer crosslinked with the elastomeric polymer. The sealant preferably contains corrosion inhibitors and suitable stabilizers such as antioxidants, and also preferably has memory properties, being able to absorb energy on being deformed and to return to its original state upon removal of the source of stress. The sealant material is filled to a selected level in central regions 32,34 such that enough of the material will become displaced by connectors 154,158 and splice adapter 160 and the cables 152,156 upon full closure of covers 12,14 therearound, to press the sealant past the deflected dams 114 and at least partially into the empty areas adjacent the cable exits, thus effectively sealing the cable splice. Optionally the sufficient quantity of sealant material may be filled into cover members 12,14 to result in extrusion along the cables 152,156 outwardly of the cable exits to indicate full embedment of the cable splice 150 in sealant.

Centrally disposed in central regions 32,34 of cover members 12,14 are pairs of semiannular flanges 116 spaced from each other. Upon placement of cable splice 150 into cover member 12, rotatable coupling nuts 162 are positioned just outwardly of the pair of flanges 116 of cover member 12, with splice adapter flange 164 between flanges 116. The inner semiannular surface 118 of each flange 116 is of a radius slightly larger than the outer radius of splice adapter 160, thus altogether positioning the splice adapter centrally axially along cable channels 20,22 and radially within cover members 12,14 of enclosure 10 upon full closure thereof about cable splice 150.

In another embodiment of the invention illustrated in FIGS. 7 to 9, splice enclosure 200 is adapted to be utilized with cable 202 that extends aerially and includes a suspension wire 204 therealong permitting physical attachment of the cable to support such as poles and buildings without stressing the conductors of the cable. Enclosure 200 includes structure for being secured around a length of suspension wire of the cable, such as a separate length 206 spliced to ends of the suspension wire 204 of the original cable at the splice location. Wire-receiving grooves 208 are defined into axially extending flange portions 210 along the hinged side 212 of one cover member 214 of, the enclosure inwardly of the hinge portions 216 but outwardly of latch members 218 along the hinged side. The enclosure in its open position is placed about the suspension wire with the spliced suspension wire length 206 extending along grooves 204. As shown in FIG. 9, upon closure about cable splice connection 220 the spliced suspension wire length is trapped in the grooves by complementary flange portions 222 of the opposite cover member 224 of the enclosure with the hinge 216 outwardly thereof and the latches 218 inwardly thereof. Suspension wire length 206 is affixable to suspension wire 204 of cable 202 such as by ends 226,228 of each being looped about each other and wound around adjacent portions thereof, at a joint 230 one of which is shown in FIG. 9.

The enclosure disclosed herein may be useful for purposes other than sealingly enclosing cable splices, since the one-piece molding may provide a pair of cover members fully and assuredly latchable together at their mating faces without other accessories and without any reliance on the integral hinges which may become weakened when being bent severely to close the covers.

Variations and modifications may occur to the specific example disclosed herein, which are within the spirit of the inventions and the scope of the claims.

We claim:

1. An enclosure of the type having first and second cover members securable together along mating faces thereof, comprising:

first and second cover members molded of resilient material in a single piece, joined to each other along adjacent side edges by a flexible living hinge portion, and include integral complementary latching members along remote side edges that are engageable upon closure of the cover members, thus fully securing together at said mating faces without other fastening means, and further include integral complementary latching members along said adjacent side edges, said cover members containing integral securing means for assuredly securing to each other along opposed side edges thereof.

2. An enclosure as set forth in claim 1 wherein said first and second cover members include opposing axially extending flange portions along said adjacent side edges between said hinge portion and complementary latching members therealong, and said flange portions of at least one of said cover members define a groove into a surface thereof facing the opposed flange portions, whereby a suspension wire length is receivable into said groove when said enclosure is in an open position and is held therein upon closure of said enclosure, thereby being adapted to be used with aerially suspended cable at a splice thereof.

3. The enclosure as set forth in claim 1 wherein said first and second cover members include upstanding wall portions and complementary wall-receiving regions along said adjacent and remote side edges inwardly of said complementary latching members, each of said upstanding wall portions having a leading end adapted to bear against a complementary surface of a corresponding one of said complementary wall-receiving regions during closure of said first and second cover members, bounding a central region of said cover members for retention of sealant material therewithin.

4. An enclosure as set forth in claim 3 wherein one of said upstanding wall portions is defined along one of said adjacent and remote side edges of each of said first and second cover members and one of said complementary wall-receiving regions is defined along the other thereof, all complementary to the other of said first and second cover members.

* * * * *